(12) United States Patent
Yu et al.

(10) Patent No.: US 11,985,301 B2
(45) Date of Patent: May 14, 2024

(54) TEST FIXTURE

(71) Applicants: Chengdu BOE Optoelectronics Technology Co., Ltd., Sichuan (CN); BOE Technology Group Co., Ltd., Beijing (CN)

(72) Inventors: Chi Yu, Beijing (CN); Bo Shi, Beijing (CN); Rui Zhou, Beijing (CN); Weiyun Huang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 291 days.

(21) Appl. No.: 17/511,473

(22) Filed: Oct. 26, 2021

(65) Prior Publication Data
US 2022/0141451 A1 May 5, 2022

(30) Foreign Application Priority Data
Oct. 30, 2020 (CN) .......................... 202022468765.1

(51) Int. Cl.
| | | |
|---|---|---|
| H04N 17/00 | (2006.01) | |
| G01M 11/02 | (2006.01) | |
| G09G 3/00 | (2006.01) | |
| H04M 1/02 | (2006.01) | |

(52) U.S. Cl.
CPC ...... *H04N 17/002* (2013.01); *G01M 11/0207* (2013.01); *G09G 3/006* (2013.01); *H04M 1/0264* (2013.01); *G01M 11/0214* (2013.01)

(58) Field of Classification Search
CPC ........ G09G 3/006; G02F 1/1309; G01R 1/04; G01R 1/0408; G01M 11/00; G01M 11/02; G01M 11/0207; G01M 11/0214; G01N 2021/9513
See application file for complete search history.

(56) References Cited

U.S. PATENT DOCUMENTS

| | | | | |
|---|---|---|---|---|
| 6,150,833 A | * | 11/2000 | Lin | G09G 3/006 324/760.02 |
| 6,353,466 B1 | * | 3/2002 | Park | G02F 1/1309 324/750.25 |
| 2002/0030149 A1 | * | 3/2002 | Okuno | G09G 3/006 248/346.01 |
| 2002/0043982 A1 | * | 4/2002 | Okuno | G09G 3/006 324/756.05 |
| 2002/0135395 A1 | * | 9/2002 | Smith | G09G 3/006 348/E17.005 |
| 2010/0033191 A1 | * | 2/2010 | Lee | G01R 31/001 324/555 |

(Continued)

*Primary Examiner* — Steven L Yeninas
(74) *Attorney, Agent, or Firm* — IPro, PLLC (57) ABSTRACT

Disclosed is a test fixture. The test fixture includes a fixture body, a support portion and a first adjustment mechanism; the fixture body is provided with a recess configured for placement of a test camera assembly to be tested, and a depth of the recess is equal to or greater than a thickness of the test camera assembly; the support portion is connected to the fixture body and provided with a support plane parallel to a bottom surface of the recess and configured for placement of a display panel to be tested; and the first adjustment mechanism is arranged on the fixture body and configured to adjust a size of the recess to fasten the test camera assembly.

19 Claims, 6 Drawing Sheets

(56) References Cited

U.S. PATENT DOCUMENTS

2014/0182785 A1* 7/2014 Kim .................. B23K 31/10
156/345.1
2018/0330651 A1* 11/2018 Miyatani ................ G09F 9/00

\* cited by examiner

TEST FIXTURE

CROSS-REFERENCE TO RELATED APPLICATION

This application is based on and claims priority to the Chinese patent application No. 202022468765.1, filed on Oct. 30, 2020 and entitled "TEST FIXTURE," the disclosure of which is incorporated herein by reference in its entirety.

TECHNICAL FIELD

The present disclosure relates to the field of test technologies, and in particular relates to a test fixture.

BACKGROUND

Compared with a traditional liquid crystal display (LCD), an organic light-emitting diode (OLED) display device has the advantages of self-luminescence, a wide color gamut, a high contrast, lightness and thinness, and meanwhile, OLEDs are also widely used in flexible wearable fields such as smart phones. Moreover, owing to its ultra-high screen-to-body ratio and better user experience, the OLED display device has gradually become the mainstream form of mobile phones. With the continuous improvement of technologies, an under-panel camera is one of the development trends of full screens in the future.

In order to evaluate the performance of a full display with camera (FDC) display panel more realistically, it is necessary to use different mobile phones in the market for evaluation.

SUMMARY

According to one aspect of the present disclosure, a test fixture is provided. The test fixture includes: a fixture body, provided with a recess configured to accommodate a test camera assembly, wherein a depth of the recess is not less than a thickness of the test camera assembly; a support portion, disposed outside the recess, opposite to an end portion of the recess and connected to the fixture body, wherein the support portion is provided with a support plane, the support plane being parallel to a bottom surface of the recess and configured for placement of a display panel to be tested; and a first adjustment mechanism, connected to the fixture body and configured to adjust a width of the recess.

In some embodiments, the fixture body includes a first clamp plate and a second clamp plate; wherein the first clamp plate and the second clamp plate are arranged side by side, a side of the first clamp plate proximal to the second clamp plate is provided with a first recessed portion, and a side of the second clamp plate proximal to the first clamp plate is provided with a second recessed portion, wherein the first recessed portion and the second recessed portion cooperate to form the recess.

In some embodiments, the first adjustment mechanism includes: an adjustment screw in threaded connection to both the first clamp plate and the second clamp plate.

In some embodiments, a thread rotation direction of an end of the adjustment screw connected to the first clamp plate is opposite to a thread rotation direction of an end of the adjustment screw connected to the second clamp plate.

In some embodiments, the adjustment screw is disposed at a bottom of the recess.

In some embodiments, the support portion includes at least one of: a first support plate, connected to the first clamp plate, wherein the support plane includes a top surface of the first support plate; and a second support plate, connected to the second clamp plate, wherein the support plane includes a top surface of the second support plate.

In some embodiments, the test fixture further includes: a gasket, disposed on the bottom surface of the recess.

In some embodiments, an angle defined between a center line of the support plane and a center line of the bottom surface ranges from 0° to 90°.

In some embodiments, the test fixture further includes a first restrict member disposed on the support plane, wherein the first restrict member is connected to the support portion and configured to restrict a position of the display panel to be tested.

In some embodiments, the first restrict member includes: at least two first protrusions spaced apart from each other, wherein an area between the two first protrusions is configured for placement of the display panel to be tested.

In some embodiments, the first protrusion includes a screw in threaded connection to the support portion.

In some embodiments, the test fixture further includes a second restrict member disposed outside the recess, wherein the second restrict member is connected to the fixture body and configured to restrict a position of the test camera assembly.

In some embodiments, the second restrict member includes: at least two second protrusions spaced apart from each other, wherein an area between the two second protrusions is configured for placement of the test camera assembly.

In some embodiments, the second protrusion includes a screw in threaded connection to the fixture body.

In some embodiments, the support portion includes: a second adjustment mechanism, configured to adjust a position of the display panel to be tested.

In some embodiments, the second adjustment mechanism includes a first adjustment plate and a second adjustment plate; and the first adjustment plate is fixedly connected to the fixture body, and the second adjustment plate is stacked on the first adjustment plate and slidable relative to the first adjustment plate.

In some embodiments, a top surface of the first adjustment plate is provided with one of a first guide rail and a first guide groove; a bottom surface of the second adjustment plate is provided with the other of the first guide rail and the first guide groove; and the first guide rail is disposed in the first guide groove and extends in a direction parallel to the support plane.

In some embodiments, the second adjustment mechanism further includes a first differential head provided with a first fixed end and a first moving end, wherein one the first fixed end and the first moving end is fixedly connected to the first adjustment plate, and the other of the first fixed end and the first moving end is fixedly connected to the second adjustment plate.

In some embodiments, the second adjustment mechanism further includes a third adjustment plate and a second differential head; the third adjustment plate is disposed on a top surface of the second adjustment plate and slidable relative to the second adjustment plate; a sliding direction of the third adjustment plate relative to the second adjustment plate intersects with a sliding direction of the second adjustment plate relative to the first adjustment plate; and the second differential head is provided with a second fixed end and a second moving end, either the second fixed end or the second moving end is fixedly connected to the second adjustment plate, and the other of the second fixed end and the second moving end is fixedly connected to the third adjustment plate.

In some embodiments, the support portion is provided with a suction hole disposed on the support plane.

DETAILED DESCRIPTION

Now exemplary embodiments will be described more fully with reference to the accompanying drawings. However, the exemplary embodiments can be implemented in various ways and shall not be construed as limited to the embodiments set forth herein; on the contrary, these embodiments are provided to make the present disclosure full and complete, and fully convey the concept of the exemplary embodiments to those skilled in the art. The same reference numerals through the drawings denote the same or similar structures, and thus their detailed description will be omitted.

A test fixture configured to test an FDC display panel is provided by an exemplary embodiment. Referring to schematic structural diagrams of various exemplary embodiments of the test fixtures shown in FIGS. 1-11, the test fixture may include a fixture body 1, a support portion 2 and a first adjustment mechanism 3.

The fixture body 1 is provided with a recess 13 configured to accommodate a test camera assembly. The depth of the recess 13 is not less than the thickness of the test camera assembly. The support portion 2 is disposed outside the recess 13, is opposite to an end portion of the recess 13 and is connected to the fixture body 1. The support portion 2 is provided with a support plane 23, and the support plane 23 is parallel to a bottom surface of the recess 13 and configured for placement of a display panel 6 to be tested. The first adjustment mechanism 3 is connected to the fixture body 1 and configured to adjust the width of the recess 13.

In some exemplary embodiments, the depth of the recess 13 is equal to the thickness of the test camera assembly. In other exemplary embodiments, the depth of the recess 13 is greater than the thickness of the test camera assembly.

The first adjustment mechanism 3 is arranged on the fixture body 1. A size of the recess 13 is changed by adjusting a width of the recess 13 to fasten the test camera assembly, such that the recess 13 and the test camera assembly are matched in size.

In the related art, in order to achieve higher transmittance, there is still certain difference in the display effect between an FDC area and other areas although the FDC area is specially treated. Therefore, it is necessary to make a size of the FDC area as small as possible in design to reduce the difference and make it difficult to distinguish. However, this will increase the difficulty of alignment in an evaluation, and inaccurate alignment has a great impact on a final test result. Moreover, different mobile phones are of different shapes and sizes, especially for a curved display panel, a test mobile phone and a display panel to be tested fail to fit each other, enabling a gap between them, which makes it more difficult to test accurately. In an embodiment of the present disclosure, since the depth of the recess 13 is equal to or greater than the thickness of the test camera assembly, in the case that the test camera assembly is placed in the recess 13, the test camera assembly dose not protrude from the recess 13. The support plane 23 is configured for placement of the display panel 6 to be tested so as to ensure that the display panel 6 to be tested may not shake. Since the support plane 23 is parallel to the bottom surface of the recess 13, the display panel 6 to be tested and the test camera assembly may be parallel to each other, ensuring the accuracy of the test result. The size of the recess 13 is adjusted by the first adjustment mechanism 3 to fasten the test camera assembly, ensuring that the test camera assembly may not shake and further ensuring the accuracy of the test result. An adjustment to the size of the recess 13 enables the test fixture to adapt to different test camera assemblies, which facilitates alignment during a test.

In an exemplary embodiment, the test camera assembly includes a camera, a circuit board and a processor, the camera is connected to the processor by the circuit board, and various circuit structures required for normal operation of the camera are arranged on the circuit board. The test camera assembly may be a mobile terminal with a camera, e.g., a test mobile phone. In an embodiment of the present disclosure, the test camera assembly is taken as an example of a test mobile phone for description.

Figure 1:
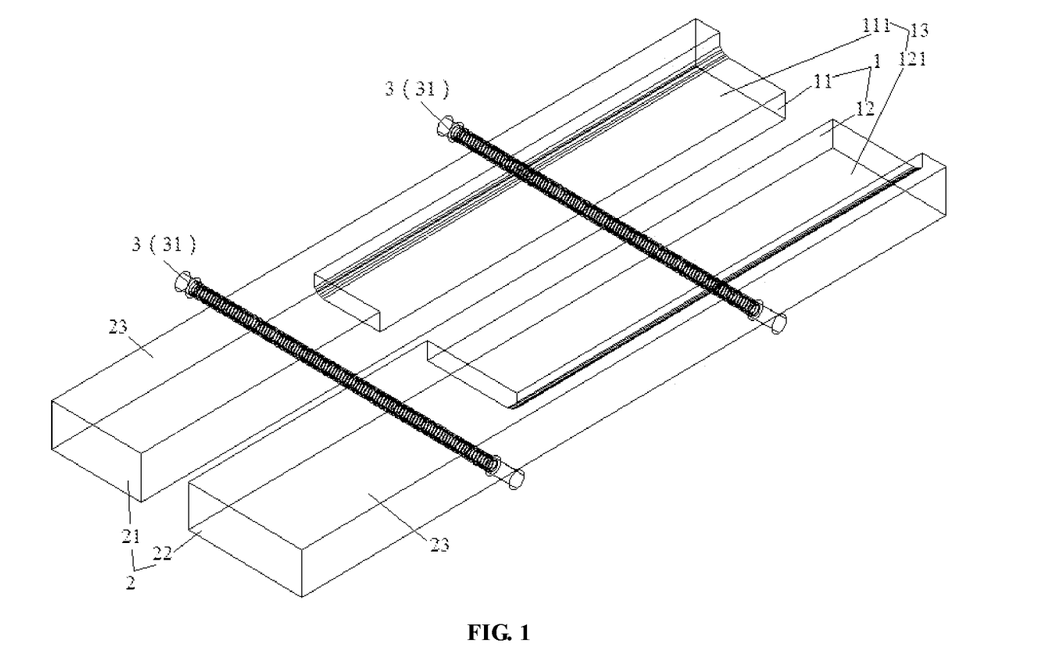
FIG. 1 is a schematic perspective structural diagram of a test fixture according to an embodiment of the present disclosure.

As shown in FIG. 1, the fixture body 1 includes a first clamp plate 11 and a second clamp plate 12 that are arranged side by side. A side of the first clamp plate 11 proximal to the second clamp plate 12 is provided with a first recessed portion 111, a side of the second clamp plate 12 proximal to the first clamp plate 11 is provided with a second recessed portion 121, and the first recessed portion 111 and the second recessed portion 121 cooperate to form the recess 13.

In this exemplary embodiment, the first clamp plate 11 is provided with the first recessed portion 111 with a depth equal to the thickness of the test mobile phone. The first recessed portion 111 is arranged into a cuboid shape. One of long sides and one of short sides of the first recessed portion 111 are provided with recess walls, and the other long side and the other short side of the first recessed portion 111 are disposed at an edge of the first clamp plate 11, provided with fro recess wall, and thus in an open state.

The second clamp plate 12 is provided with the second recessed portion 121 with a depth equal to the thickness of the test mobile phone. The second recessed portion 121 is also arranged into a cuboid shape. A length of the second recessed portion 121 is the same as that of the first recessed portion 111, and a width of the second recessed portion 121 is also die same as that of the first recessed portion 111. One of long sides and one of the short sides of the second recessed portion 1211 are provided with recess walls, and the other long side and the other short side of the second recessed portion 121 are disposed at an edge of the second clamp plate 12, provided with no recess wall and thus in an open state.

The depth of the first recessed portion 111 is the same as that of the second recessed portion 121, and the first recessed portion 111 and the second recessed portion 121 form the recess 13. In an exemplary embodiment, the depth of the recess 13 is ranged from 6 mm to 15 mm. Since the first recessed portion 111 and the second recessed portion 121 both have only two side walls, the test mobile phone may be placed in the recess 13 even in the case that a length of the test mobile phone exceeds that of the recess 13. The width of the recess 13 is changed by adjusting the distance between the first clamp plate 11 and the second clamp plate 12, such that the recess and the test mobile phone match in width, thus the test mobile phone may be fastened.

Certainly, in the case that the test camera assembly is not a test mobile phone, but other mobile terminals with cameras or only cameras, the shape of the recess 13 may be adapted to the shape of the mobile terminal or camera.

In some exemplary embodiments, the support portion 2 includes at least one of a first support plate 21 and a second support plate 22, and the support plane 23 is a top surface of the support plate. For example, in an embodiment of the present disclosure, the support portion 2 includes a first support plate 21 and a second support plate 22, and the support plane 23 includes a top surface of the first support plate 21 and a top surface of the second support plate 22.

As shown in FIG. 1, the first support plate 21 is connected to the first clamp plate 11, and the second support plate 22 is connected to the second clamp plate 12.

As an example, in an embodiment of the present disclosure, the first clamp plate 11, the first support plate 21, the second clamp plate 12 and the second support plate 22 are all in cuboid shapes. The width of the first clamp plate 11 is the same as that of the first support plate 21, and the thickness of the first clamp plate 11 is the same as that of the first support plate 21. The thickness of the first clamp plate 11 refers to the thickness of an area on the first clamp plate 11 except for the first recessed portion 111. A side edge of the first clamp plate 11 is connected to a side edge of the first support plate 21, a width of the side edge of the first clamp plate 11 is corresponding to a width of the side edge of the first support plate 21.

The width of the second clamp plate 12 is the same as that of the second support plate 22, and the thickness of the second clamp plate 12 is the same as that of the second support plate 22. The thickness of the second clamp plate 12 refers to the thickness of an area on the second clamp plate 12 except for the second recessed portion 121. A side edge of the second clamp plate 12 is connected to a side edge of the second support plate 22, a width of the side edge of the second clamp plate 12 is corresponding to a width of the side edge of the second support plate 22.

The first support plate 21 is provided with a first support plane being the top surface of the first support plate 21. The second support plate 22 is provided with a second support plane being the top surface of the second support plate 22. The first support plane and the second support plane are both parallel to the bottom surface of the recess 13, and the first support plane and the second support plane are coplanar. The support plane 23 includes the first support plane and the second support plane and is configured for placement of the display panel 6 to be tested.

As shown in FIG. 1, the first adjustment mechanism 3 includes an adjustment screw 31 in threaded connection to the first clamp plate 11 and the second clamp plate 12 respectively.

Each of the first clamp plate 11 and the first support plate 21 is provided with one first threaded hole extending in a width direction of the first clamp plate 11. Each of the second clamp plate 12 and the second support plate 22 is provided with one second threaded hole extending in a width direction of the second clamp plate 12. The first threaded hole of the first clamp plate 11 is coaxial with the second threaded hole of the second clamp plate 12. The first threaded hole of the first support plate 21 is coaxial with the second threaded hole of the second support plate 22.

The adjustment screw 31 penetrates the first threaded hole of the first clamp plate 11 and the second threaded hole of the second clamp plate 12, and the first clamp plate 11 and the second clamp plate 12 are connected together by the engagement of the first threaded holes and one of the second threaded holes. The distance between the first clamp plate 11 and the second clamp plate 12 may be changed to adjust the width of the recess 13 by screwing up the adjustment screw 31.

In some exemplary embodiments, a thread rotation direction of an end of the adjustment screw 31 connected to the first clamp plate 11 is opposite to a thread rotation direction of an end of the adjustment screw 31 connected to the second clamp plate 12. Since the thread rotation directions of the two ends of the adjustment screw 31 are opposite, the first clamp plate 11 and the second clamp plate 12 may be relatively close to or relatively away from each other in the case that the adjustment screw 31 is screwed, such that the width of the recess 13 is changed.

As an example, in an embodiment of the present disclosure, two adjustment screws 31 are arranged, and the other adjustment screw 31 penetrates the first threaded hole of the first support plate 21 and the second threaded hole of the second support plate 22. In other examples, a greater number of adjustment screws 31 may be arranged, and correspondingly, more threaded holes may be arranged.

As shown in FIG. 1, the adjustment screw 31 is disposed at a bottom of the recess 13, preventing adjustment screw 31 from entering the recess 13 and hence adversely affecting the placement of the test mobile phone.

Certainly, the shapes of the first clamp plate 11, the second clamp plate 12, the first support plate 21 and the second support plate 22 are not limited to the above examples. In other examples, the first clamp plate H the second clamp plate 12, the first support plate 21 and the second support plate 22 may be arranged into various shapes such as a cylinder and a trapezoid. The first clamp plate 11 and the second clamp plate 12 may be arranged symmetrically or asymmetrically, and the first support plate 21 and the second support plate 22 may be arranged symmetrically or asymmetrically.

In some examples, the depth of the recess 13 is greater than the thickness of the test mobile phone. The test fixture further includes a gasket arranged in the recess 13. That is, the gasket is disposed on a bottom surface of the recess 13. A sum of the thicknesses of the test mobile phone and the gasket is the same as the depth of the recess 13 by arranging the gasket. The thickness of the single gasket and a number of the gaskets are set based on the thickness of the test mobile phone, such that the sum of the thicknesses of the test mobile phone and the placed gaskets is the same as the depth of the recess 13.

Figure 2:
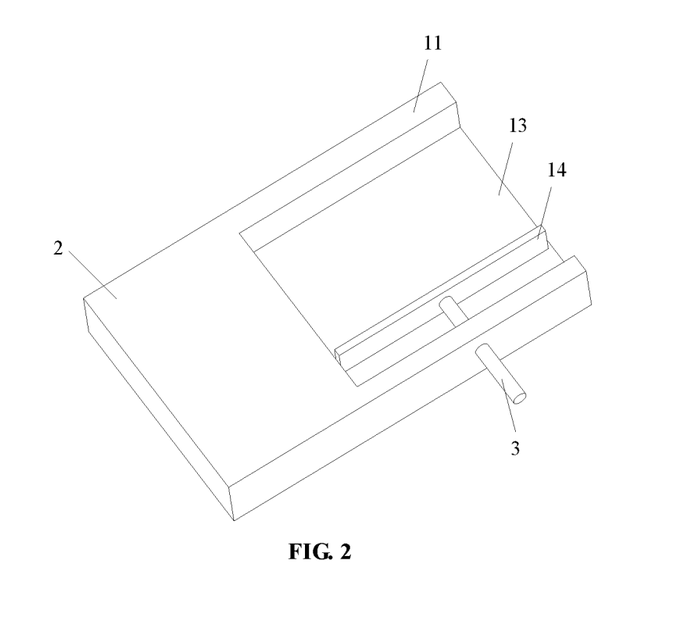
FIG. 2 is a schematic structural diagram of a test fixture according to an embodiment of the present disclosure.

In other examples, the fixture body 1 includes a first clamp plate 11 and an adjustment plate 14. As shown in FIG. 2, the top surface of the first clamp plate 11 is provided with a recess where the adjustment plate 14 is disposed. The adjustment plate 14 is connected to one side wall of the recess by the first adjustment mechanism 3, and the adjustment plate 14 and the side wall of the recess form the recess 13. The width of the recess 13 may be adjusted by changing the position of the adjustment plate 14 in the recess by the first adjustment mechanism 3, so as to fasten the test mobile phone of the corresponding size.

Figure 3:
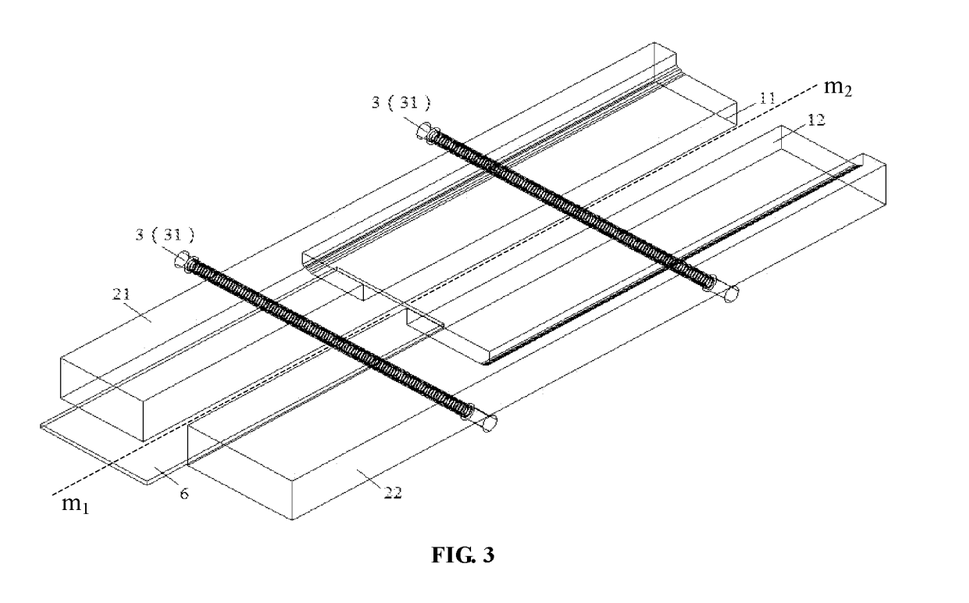
FIG. 3 is a schematic perspective diagram of the test fixture in FIG. 1 in a state of being used.

In some exemplary embodiments, an angle defined between a center line $m_1$ of the support plane 23 and a center line $m_2$ of the bottom surface ranges from 0° to 90°, and an angle of 0° indicates parallelism. Referring to FIG. 3, the center line of the support plane 23 is parallel to the center line of the recess 13. The center line $m_1$ of the support plane 23 is a line connecting all midpoints of the support plane 23 in a width direction of the recess 13. The center line $m_2$ of the recess 13 is a line connecting all midpoints of the bottom surface of the recess 13 in the width direction of the recess 13. This case is applicable to the situation where a center line of the display panel 6 to be tested is parallel to a center line of the test mobile phone during a test, and the display panel 6 to be tested does not need to be disposed as inclined. In the case that a camera of the test mobile phone is disposed in the middle of a width direction of the test mobile phone, the display panel 6 to be tested is placed on the first support plane and the second support plane.

Figure 4:
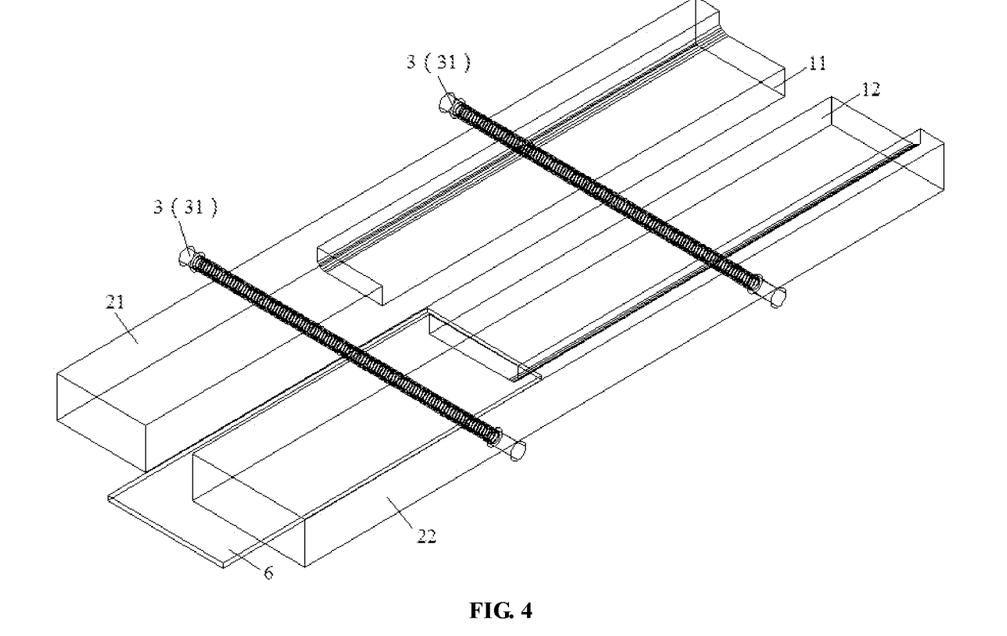
FIG. 4 is a schematic perspective diagram of the test fixture in FIG. 1 in a state of being used.

Referring to FIG. 4, in the case that the camera of the test mobile phone is disposed at one corner of the test mobile phone, the display panel 6 to be tested is disposed on the second support plane of the second support plate 22. The position where the display panel 6 to be tested is placed is determined based on the position of the camera of the test mobile phone. For example, the display panel 6 to be tested may also be placed on the first support plane of the first support plate 21.

Figure 5:
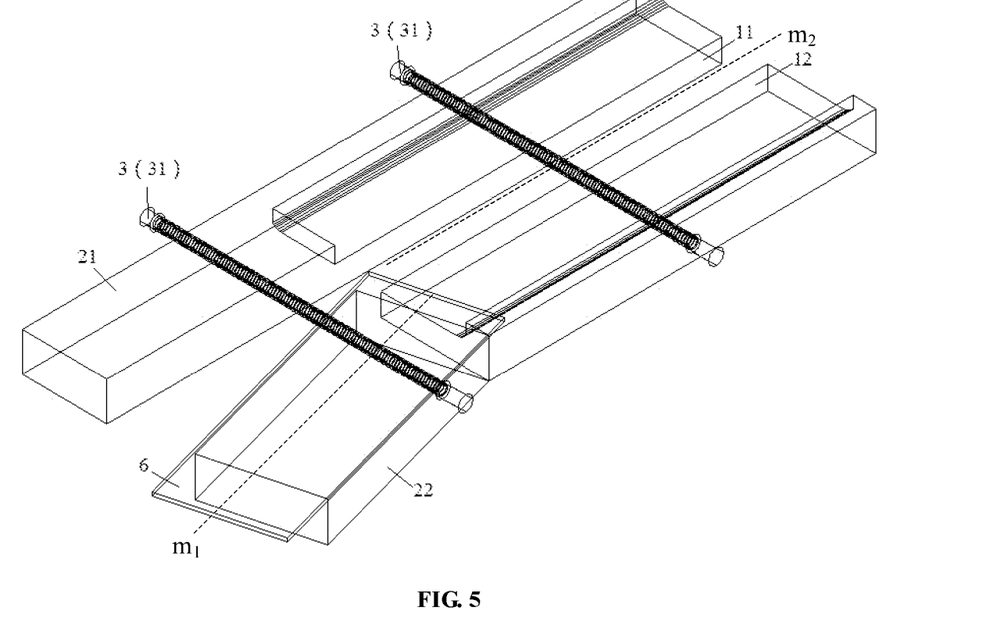
FIG. 5 is a schematic perspective structural diagram of a test fixture according to an embodiment of the present disclosure.

Referring to FIG. 5, an angle is defined between the center line $m_1$ of the support plane 23 and the center line $m_2$ of the recess 13. In the case that it is necessary to define an angle between the center line of the display panel 6 to be tested and the center line of the test mobile phone in a test, the second support plate 22 may be disposed as inclined relative to the second clamp plate 12, such that a preset angle defined between a center line of the second support plate 22 and a center line of the second clamp plate 12 is formed, and the size of the angle may be set as required. Certainly, the first support plate 21 may also be disposed as inclined relative to the first clamp plate 11 as required, such that a preset angle is defined between a center line of the first support plate 21 and a center line of the first clamp plate 11, and the size of the angle is defined as required. The inclination direction and the inclination angle of the first support plate 21 may be the same as or different from those of the second support plate 22.

In some embodiments, the test fixture further includes a first restrict member disposed on the support plane 23, wherein the first restrict member is connected to the support portion 2, and configured to restrict the position of the display panel 6 to be tested.

In an exemplary embodiment, the first restrict member includes at least two first protrusions 41. The first protrusions 41 are spaced apart from each other, and an area between all the first protrusions 41 is configured for placement of the display panel 6 to be tested.

Figure 6:
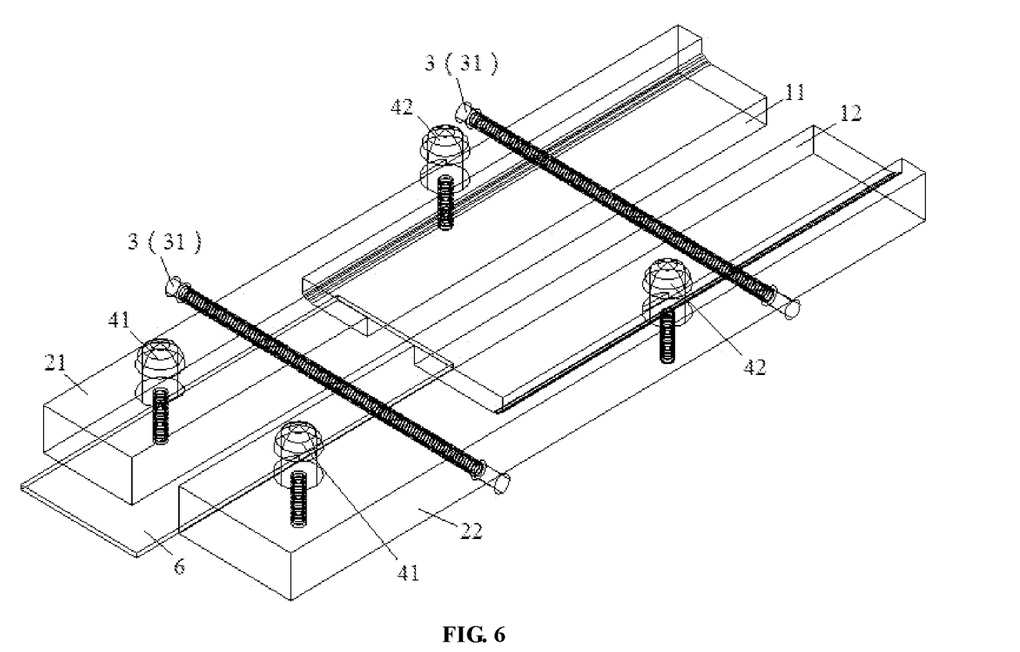
FIG. 6 is a schematic perspective structural diagram of a test fixture according to an embodiment of the present disclosure.
Figure 7:
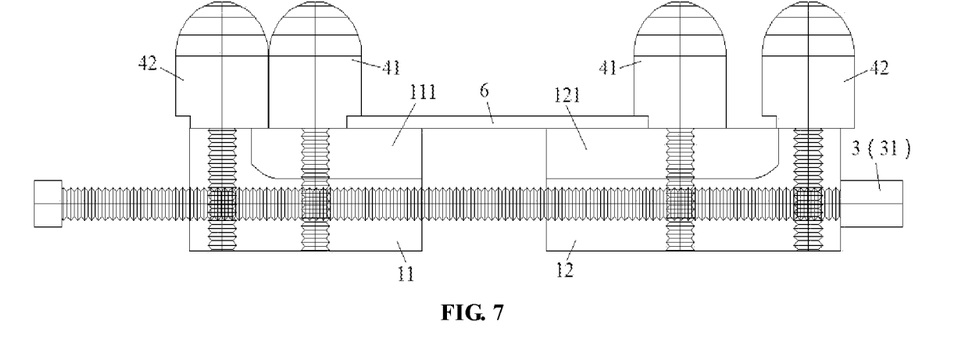
FIG. 7 is a schematic side perspective diagram of FIG. 6.

Referring to FIGS. 6 and 7, in this exemplary embodiment, the first restrict member includes two first protrusions 41 spaced apart from each other on the support plane 23 and protruding from the support plane 23. The display panel 6 to be tested is clamped between the first protrusions 41. the display panel 6 to be tested being clamped by the first protrusions 41 can prevent the display panel 6 to be tested from shaking and further improve the accuracy of the test.

In some embodiments, the first protrusion 41 includes a screw in threaded connection to the support portion 2. In this example, two threaded holes are arranged in the support portion 2, the first support plate 21 is provided with one threaded hole, and the second support plate 22 is provided with the other threaded hole. The two screws are arranged in the two threaded holes respectively. The protrusion heights of the screws relative to the support plane 23 may be adjusted by screwing up the screws. Screw heads of the screws may press the display panel 6 to be tested, thereby preventing the display panel 6 to be tested from shaking.

As an example, two first protrusions 41 are provided in an embodiment of the present disclosure. In other examples, there may be three first protrusions 41 clamped at three side edges of the display panel 6 to be tested respectively, so as to further locate the display panel 6 to be tested, and further improve the accuracy of the test.

As an example, in an embodiment of the present disclosure, only one first protrusion 41 is arranged on a same side of the display panel 6 to be tested, and in other examples, two or more first protrusions 41 are arranged on the same side of the display panel 6 to be tested.

In some exemplary embodiments, the test fixture further includes a second restrict member disposed outside the recess 13, wherein the second restrict member is connected to the fixture body 1, and configured to restrict the position of the test camera assembly.

In an exemplary embodiment, the second restrict member includes at least two second protrusions 42. The second protrusions 42 are spaced apart from each other, and an area between all the second protrusions 42 is configured for placement of the test camera assembly.

In this exemplary embodiment, the second restrict member includes two second protrusions 42 spaced apart from each other on the fixture body 1 and protruding from the fixture body 1. The test mobile phone is clamped between the second protrusions 42. The test mobile phone being clamped by the second protrusions 42 can prevent the test mobile phone from shaking and further improve the accuracy of the test.

In some exemplary embodiments, the second protrusion 42 includes a screw in threaded connection to the fixture body 1. In this example, each of the first clamp plate 11 and the second clamp plate 12 is provided with one threaded hole, and the two screws are arranged in the two threaded holes respectively. The protrusion heights of the screws relative to the fixture body 1 may be adjusted by screwing up the screws. Screw heads of the screws may press the test mobile phone, thereby preventing the test mobile phone from shaking.

As an example, two second protrusions 42 are provided in an embodiment of the present disclosure. In other examples, there may be three second protrusions 42 clamped at three side edges of the test mobile phone respectively, so as to further locate the test mobile phone and further improve the accuracy of the test.

As an example, in an embodiment of the present disclosure, only one second protrusion 42 is provided on a same side of the test mobile phone, and in other examples, two or more second protrusions 42 are provided on a same side of the test mobile phone.

Figure 8:
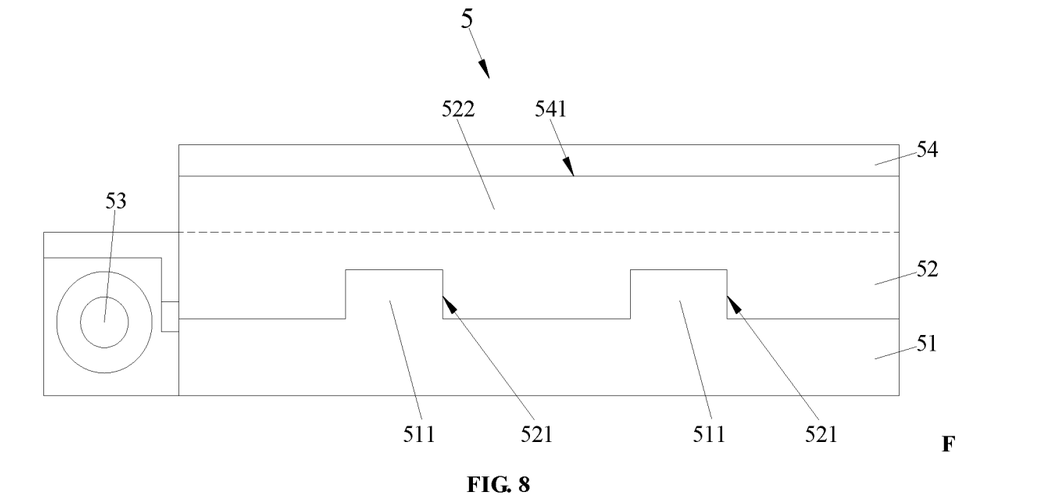
FIG. 8 is a schematic structural diagram of a test fixture according to an embodiment of the present disclosure.
Figure 9:
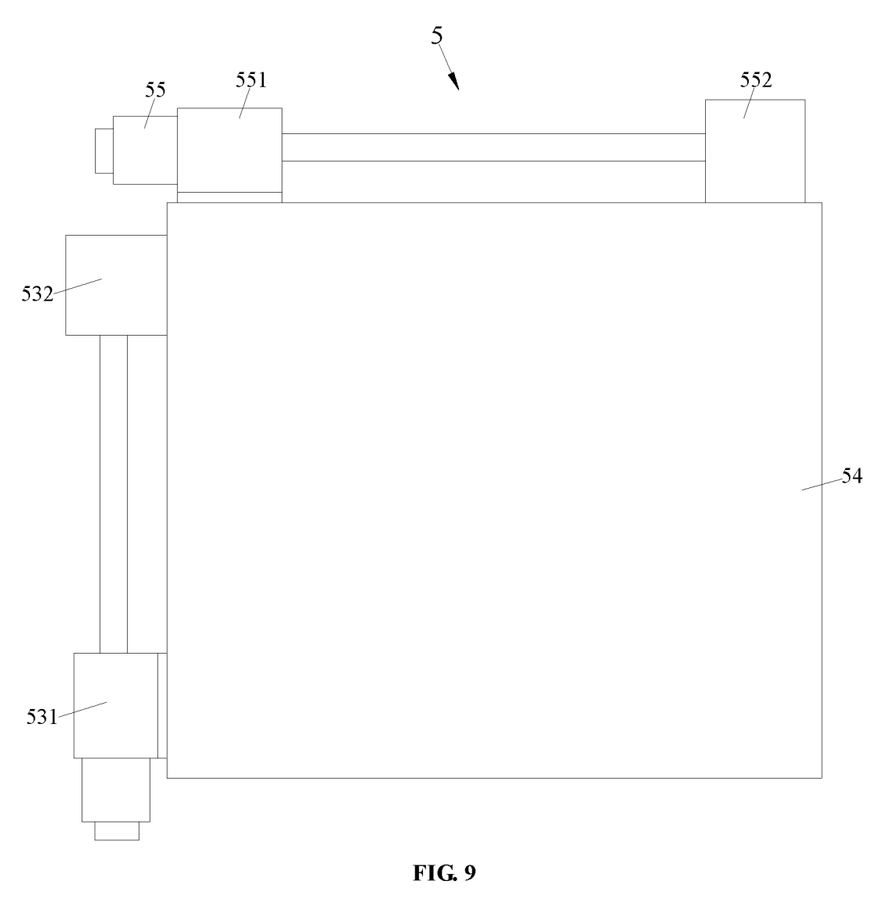
FIG. 9 is a schematic top diagram of FIG. 8.

Referring to FIGS. 8 and 9, in some examples, the support portion 2 includes a second adjustment mechanism 5 configured to adjust the position of the display panel 6 to be tested.

In some exemplary embodiments, the second adjustment mechanism 5 includes a first adjustment plate 51 and a second adjustment plate 52. The first adjustment plate 51 is fixedly connected to the fixture body 1. The second adjustment plate 52 is stacked on the first adjustment plate 51 and slidable relative to the first adjustment plate 51. During the test, the display panel 6 to be tested is placed on a top surface of the second adjustment plate 52, such that the relative position of the display panel 6 to be tested and the test mobile phone may be adjusted by sliding the second adjustment plate 52.

In some exemplary embodiments, a top surface of the first adjustment plate 51 is provided with either a first guide rail 511 or a first guide groove 521. A bottom surface of the second adjustment plate 52 is provided with the other of the first guide rail 511 and the first guide groove 521. The first guide rail 511 is disposed in the first guide groove 521 and extends in a direction parallel to the support plane 23. The second adjustment plate 52 is capable of sliding along the first guide rail 511 under engagement of the first guide rail 511 and the first guide groove 521.

In some examples, the second adjustment mechanism 5 further includes a first differential head 53 provided with a first fixed end 531 and a first moving end 532. Either the first fixed end 531 or the first moving end 532 is fixedly connected to the first adjustment plate 51, and the other of the first fixed end 531 and the first moving end 532 is fixedly connected to the second adjustment plate 52. Therefore, the position of the second adjustment plate 52 may be adjusted by screwing up the first differential head 53, making the adjustment process more precise.

In some exemplary embodiments, the second adjustment mechanism 5 further includes a third adjustment plate 54 and a second differential head 55. The third adjustment plate 54 is disposed on the top surface of the second adjustment plate 52 and slidable relative to the second adjustment plate 52. a sliding direction of the third adjustment plate 54 slides relative to the second adjustment plate 52 intersects intersecting with (e.g., perpendicular to) a sliding direction of the second adjustment plate 52 relative to the first adjustment plate 51. The second differential head 55 is provided with a second fixed end 551 and a second moving end 552, either the second fixed end or the second moving end is fixedly connected to the second adjustment plate 52, and the other of the second fixed end and the second moving end is fixedly connected to the third adjustment plate 54. The third adjustment plate 54 is disposed on the top surface of the second adjustment plate 52. During the test, in the case that the display panel 6 to be tested is placed on a top surface of the third adjustment plate 54, the position of the third adjustment plate 54 may be further adjusted by the second differential head 55, so as to adjust the relative position of the display panel 6 to be tested and the test mobile phone.

In an embodiment of the present disclosure, the second adjustment mechanism 5 includes a first adjustment plate 51, a second adjustment plate 52, a first differential head 53, a third adjustment plate 54 and a second differential head 55. The first adjustment plate 51 is fixedly connected to the fixture body 1, provided with a first guide rail 511 and extending in a direction parallel to the support plane 23. The first guide rail 511 extends in a direction in which the first clamp plate 11 extends. The second adjustment plate 52 is arranged on a side of the first adjustment plate 51 provided with the first guide rail 511. A surface of the second adjustment plate 52 engaged with the first adjustment plate 51 is provided with a first guide groove 521, and a surface of the second adjustment plate 52 away from the first guide groove 521 is provided with a second guide rail 522. The second guide rail 522 extends in a direction perpendicular to the direction in which the first guide rail extends. The first fixed end 531 is fixedly connected to the first adjustment plate 51, and the first moving end 532 is fixedly connected to the second adjustment plate 52.

The third adjustment plate 54 is arranged on a side of the second adjustment plate 52 away from the first adjustment plate 51, and the third adjustment plate 54 is provided with a second guide groove 541 engaged with the second guide rail 522. The second fixed end 551 is fixedly connected to the second adjustment plate 52, and the second moving end 552 is fixedly connected to the third adjustment plate 54. A surface of the third adjustment plate 54 away from the second adjustment plate 52 is the support plane 23.

The position of the display panel 6 to be tested in the extending direction of the first clamp plate 11 extends may be adjusted by screwing up the first differential head 53. In the case that the first differential head 53 is screwed up, the first moving end 532 of the first differential head 53 moves, and the first moving end 532 drives the second adjustment plate 52 to move along the first guide rail 511. In the case that the second differential head 55 is screwed, the position of the display panel 6 to be tested in a direction perpendicular to the extending direction of the first clamp plate 11 may be adjusted. In the case that the second differential head 55 is screwed up, the second moving end 552 of the second differential head 55 moves, and the second moving end 552 drives the third adjustment plate 54 to move along the second guide rail 522.

The structure of the differential head is the same as the structure of a measuring rod of a screw micrometer, and its specific structure will not be described in detail. In an exemplary embodiment, threads in the differential head have a pitch of 0.5 mm.

Figure 10:
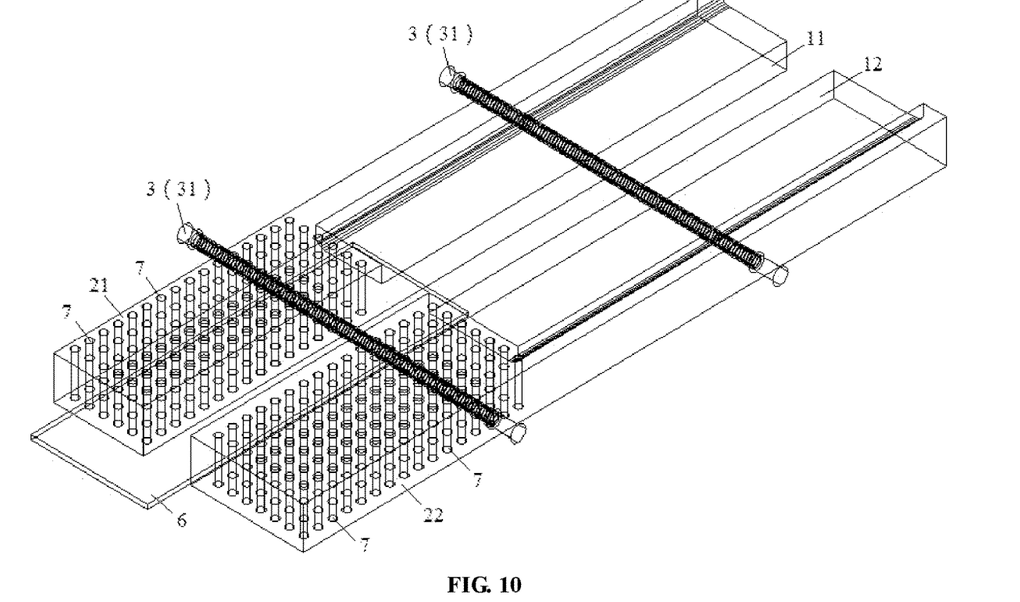
FIG. 10 is a schematic perspective structural diagram of a test fixture according to an embodiment of the present disclosure.
Figure 11:
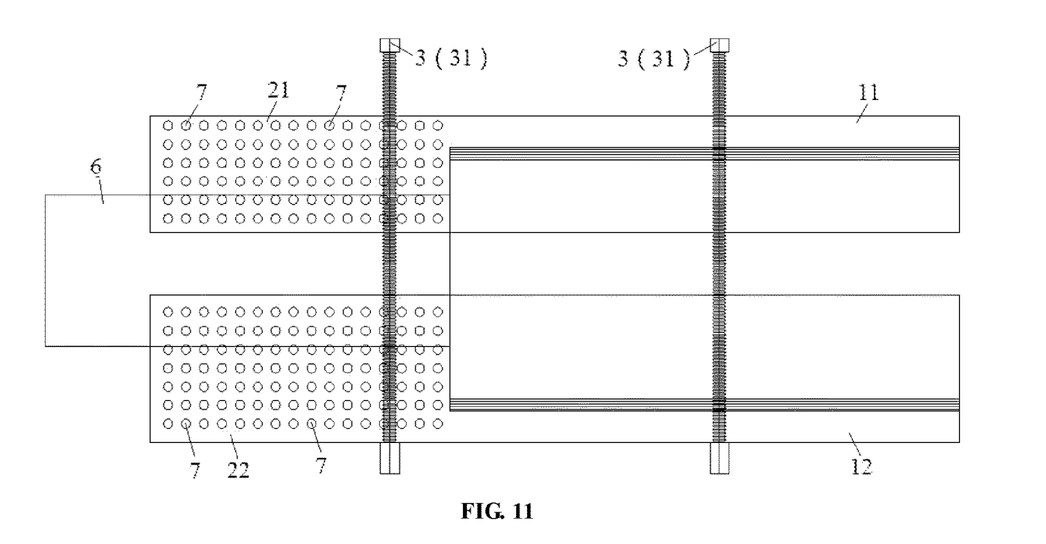
FIG. 11 is a schematic top perspective diagram of FIG. 10.

In some exemplary embodiments, the support portion 2 is provided with a suction hole disposed on the support plane 23. The display panel 6 to be tested, disposed on the support plane 23, may be sucked by the suction hole, prevented the display panel 6 from shaking. Referring to FIGS. 10 and 11, the suction hole includes a first through hole 7 disposed in the support portion 2. One end of the first through hole 7 penetrates the support plane 23, and the other end of the first through hole 7 is configured to be connected to a gas suction device, such as an air pump. The display panel 6 to be tested may be sucked onto the support plane 23 through the first through hole 7 by the gas suction device, thereby preventing the display panel 6 to be tested from shaking and improving the accuracy of the test.

In some examples, the fixture body 1 is further provided with a suction hole. The suction hole includes a second through hole (not shown in the figures) arranged at the bottom of the recess 13, one end of the second through hole penetrates the bottom surface, and the other end of the second through hole is connected to the gas suction device. The test mobile phone may be sucked onto the bottom surface through the second through hole by the gas suction device, thereby preventing the test mobile phone from shaking and improving the accuracy of the test.

The features, structures, or characteristics described above can be combined in one or more embodiments in any suitable manner. If possible, the features discussed in respective embodiment are interchangeable. In the above description, numerous specific details are provided to give a thorough explanation of the embodiments of the present disclosure. However, those skilled in the art will recognize that the technical solutions of the present disclosure can be practiced without one or more of the specific details, or other methods, components, materials, etc. can be used. In other cases, well-known structures, materials, or operations are not shown or described in detail to avoid obscuring aspects of the present disclosure.

Although relative terms such as "upper" and "lower" are used in the description to describe the relative relationship of one component with respect to another component as shown in the figures, these terms are used in this description only for convenience, for example, based on the exemplary directions shown in the figures. It is to be understood that if an apparatus shown in the figures is turned upside down, the described "upper" component will become a "lower" component. Other relative terms, such as "high," "low," "top," and "bottom,", have similar meanings. In the case that a structure is "on" another structure, it may mean that the structure is integrally formed on the another structure, or the structure is "directly" arranged on the another structure, or that the structure is "indirectly" arranged on the another structure via still another structure.

In the description, the terms "a," "an," "the," and "said" are used to indicate the presence of one or more elements/components etc. The terms "comprise," "include," and "have" are used to indicate the meaning of an opening inclusion and indicate that there may be other elements/components etc. in addition to the listed elements/components/etc. The terms "first," "second," and "third" are only used as reference only, not as a limitation on the number of subjects thereof.

It should be understood that the present disclosure will not limit its application to the detailed structure and arrangement of the components set forth in the description. The present disclosure may have other embodiments, and can be implemented and executed in various ways. The aforementioned deformations and modifications fall within the scope of the present disclosure. It should be understood that the present disclosure disclosed and defined in the description extends to all alternative combinations of two or more individual features mentioned or obvious in the text and/or drawings. Multiple alternative aspects of the present disclosure are constituted by all the different combinations. The embodiments described in the description illustrate the known alternative ways for implementing the present disclosure and will enable those skilled in the art to utilize the present disclosure.

What is claimed is:

1. A test fixture, comprising:
a fixture body, provided with a recess configured to accommodate a test camera assembly, wherein a depth of the recess is not less than a thickness of the test camera assembly;
a support portion, disposed outside the recess and opposite to an end portion of the recess and connected to the fixture body, wherein the support portion is provided with a support plane, the support plane being parallel to a bottom surface of the recess and configured for placement of a display panel to be tested; and
a first adjustment mechanism, connected to the fixture body and configured to adjust a width of the recess, wherein the fixture body comprises a first clamp plate and a second clamp plate,
the first clamp plate and the second clamp plate are arranged side by side, a side of the first clamp plate proximal to the second clamp plate is provided with a first recessed portion, and a side of the second clamp plate proximal to the first clamp plate is provided with a second recessed portion, wherein the first recessed portion and the second recessed portion cooperate to form the recess.

2. The test fixture according to claim 1, wherein the first adjustment mechanism comprises:
an adjustment screw in threaded connection to both the first clamp plate and the second clamp plate.

3. The test fixture according to claim 2, wherein a thread rotation direction of an end of the adjustment screw connected to the first clamp plate is opposite to a thread rotation direction of an end of the adjustment screw connected to the second clamp plate.

4. The test fixture according to claim 2, wherein the adjustment screw is disposed at a bottom of the recess.

5. The test fixture according to claim 1, wherein the support portion comprises at least one of:
a first support plate, connected to the first clamp plate, wherein the support plane comprises a top surface of the first support plate; and
a second support plate, connected to the second clamp plate, wherein the support plane comprises a top surface of the second support plate.

6. The test fixture according to claim 1, further comprising:
a gasket disposed on the bottom surface of the recess.

7. The test fixture according to claim 1, wherein an angle defined between a center line of the support plane and a center line of the bottom surface ranges from 0° to 90°.

8. The test fixture according to claim 1, further comprising a first restrict member disposed on the support plane, wherein the first restrict member is connected to the support portion and configured to restrict a position of the display panel to be tested.

9. The test fixture according to claim 1, wherein the first restrict member comprises:
at least two first protrusions spaced apart from each other, wherein an area between the two first protrusions is configured for placement of the display panel to be tested.

10. The test fixture according to claim 9, wherein the first protrusion comprises a screw in threaded connection to the support portion.

11. The test fixture according to claim 10, further comprising a second restrict member disposed outside the recess, wherein the second restrict member is connected to the fixture body and configured to restrict a position of the test camera assembly.

12. The test fixture according to claim 11, wherein the second restrict member comprises:
at least two second protrusions spaced apart from each other, wherein an area between the two second protrusions is configured for placement of the test camera assembly.

13. The test fixture according to claim 12, wherein the second protrusion comprises a screw in threaded connection to the fixture body.

14. The test fixture according to claim 1, wherein the support portion comprises:

a second adjustment mechanism, configured to adjust a position of the display panel to be tested.

15. The test fixture according to claim 14, wherein
the second adjustment mechanism comprises a first adjustment plate and a second adjustment plate; and
the first adjustment plate is fixedly connected to the fixture body, and the second adjustment plate is stacked on the first adjustment plate and slidable relative to the first adjustment plate.

16. The test fixture according to claim 15, wherein
a top surface of the first adjustment plate is provided with one of a first guide rail and a first guide groove;
a bottom surface of the second adjustment plate is provided with the other of the first guide rail and the first guide groove; and
the first guide rail is disposed in the first guide groove and extends in a direction parallel to the support plane.

17. The test fixture according to claim 16, wherein the second adjustment mechanism further comprises a first differential head provided with a first fixed end and a first moving end, wherein one of the first fixed end and the first moving end is fixedly connected to the first adjustment plate, and the other of the first fixed end and the first moving end is fixedly connected to the second adjustment plate.

18. The test fixture according to claim 17, wherein the second adjustment mechanism further comprises a third adjustment plate and a second differential head; the third adjustment plate is disposed on a top surface of the second adjustment plate and slidable relative to the second adjustment plate; a slide direction of the third adjustment plate relative to the second adjustment plate is intersected with a slide direction of the second adjustment plate relative to the first adjustment plate; and
the second differential head is provided with a second fixed end and a second moving end, wherein one of the second fixed end and the second moving end is fixedly connected to the second adjustment plate, and the other of the second fixed end and the second moving end is fixedly connected to the third adjustment plate,
wherein the display panel to be tested is placed on a top surface of the third adjustment plate, and the second differential head is configured to adjust a position of the third adjustment plate, so as to adjust a relative position of the display panel to be tested and the test camera assembly.

19. The test fixture according to claim 1, wherein the support portion is provided with a suction hole disposed on the support plane.

* * * * *